United States Patent [19]

Jonath

[11] 4,316,518
[45] Feb. 23, 1982

[54] AUTOMATIC ZERO CORRECTION APPARATUS FOR WEIGHING BALANCES

[75] Inventor: Eberhard Jonath, Volketswil, Switzerland

[73] Assignee: Mettler Instrumente AG, Greifensee, Switzerland

[21] Appl. No.: 195,332

[22] Filed: Oct. 9, 1980

[30] Foreign Application Priority Data

Dec. 20, 1979 [CH] Switzerland ............... 11310/79

[51] Int. Cl.³ .................. G01G 19/04; G01G 19/52; G01G 23/10
[52] U.S. Cl. ........................ 177/25; 177/50; 177/185; 177/DIG. 3
[58] Field of Search ........... 177/25, 50, 185, 210 FP, 177/DIG. 3; 364/567, 734

[56] References Cited

U.S. PATENT DOCUMENTS

| | | | |
|---|---|---|---|
| 3,665,169 | 5/1972 | Henderson et al. | 177/25 X |
| 3,786,884 | 1/1974 | Allenspach | 177/210 FP X |
| 3,797,595 | 3/1974 | Yin et al. | 177/DIG. 3 X |
| 3,860,802 | 1/1975 | Knothe et al. | 177/DIG. 3 X |
| 3,986,012 | 10/1976 | Loshbough et al. | 177/25 X |
| 4,044,846 | 8/1977 | Matilainen | 177/DIG. 3 X |
| 4,137,979 | 2/1979 | Itani | 177/DIG. 3 X |

Primary Examiner—George H. Miller, Jr.
Attorney, Agent, or Firm—Marianne Rich

[57] ABSTRACT

To achieve an automatic stabilization of the zero point in a scale having a digital display, any difference between the load proportional signal and the stored reference signal (for example, the tare value) is compared to a threshold value. Differences which are less than the threshold value are halved in a divider. The halved difference signal is then used when the next subsequent one of the load proportional signal is compared to the reference signal, preferably by algebraic addition of the halved difference signal to the reference signal.

5 Claims, 2 Drawing Figures

AUTOMATIC ZERO CORRECTION APPARATUS FOR WEIGHING BALANCES

CROSS REFERENCE TO RELATED APPLICATIONS AND PUBLICATIONS

U.S. Pat. No. 3,986,012;
U.S. Pat. No. 3,665,169;
U.S. Pat. No. 3,786,884
U.S. application Ser. No. 195,477 filed simultaneously herewith, entitled "Weighing Scale with Improved Zero Correction" by the same inventor and assigned to the same assignee; and
U.S. application Ser. No. 195,331 filed simultaneously herewith; inventor: Walter Kupper; assigned to the same assignee; title "Weighing Balance with Automatic Zero Correction".

The present invention relates to weighing methods and apparatus and, in particular, to scales periodically furnishing digital weight proportional signals. In particular, it relates to scales having automatic zero correction.

BACKGROUND AND PRIOR ART

Automatic zero point correction methods and apparatus are known. In such methods and apparatus, a signal corresponding to a reference weight is stored in a first storage. Subsequent weight-proportional signals are compared to the stored signal, the difference between the new and the stored signal being compared to a predetermined threshold value. The digital display is changed to correspond to the new value only when the difference is at least as big as the threshold value. Differences smaller than the threshold value are utilized for zero correction purposes.

Such a method is described in U.S. Pat. No. 3,665,169. In this method, differences smaller than the threshold value (first differences) cause the new weighing signal to be stored in the first storage, instead of the reference value. Thus, in the case of differences less than the threshold value, the full difference is immediately effective in changing the zero point. This method and apparatus has the disadvantage that transient oscillations in the weighing signal cause a full and generally unnessary correction.

SUMMARY OF THE INVENTION

It is an object of the present invention to furnish an automatic zero correction which does not have the above disadvantages. In other words, a reliable correction of drift is to take place, while the effect of transient oscillations is to be taken into consideration to a lesser degree.

In a known weighing method digital weight proportional signals are generated periodically. The weight proportional signals are compared to a reference signal, thereby creating main difference signals. The main difference signals in turn are compared to a predetermined threshold value and only those main difference signals exceeding the threshold value are displayed. According to the invention, a main difference signal which is smaller than the predetermined threshold value is divided by a predetermined factor thereby creating a fractional difference signal. The fractional difference signal is then utilized during the generation of the next subsequent main difference signal. Specifically, the fractional difference signal is algebraically added to the reference signal prior to the comparison between the weight proportional signal and the reference signal.

The novel features which are considered as characteristic for the invention are set forth in particular in the appended claims. The invention itself, however, both as to its construction and its method of operation, together with additional objects and advantages thereof will best be understood from the following description of specific embodiments when read in connection with the accompanying drawing.

FIG. 1 is a block diagram showing the apparatus of the present invention incorporated in a known balance; and FIG. 2 is a flow chart for a microprocessor incorporating the present invention.

DESCRIPTION OF THE PREFERRED EMBODIMENT

Figure 1:
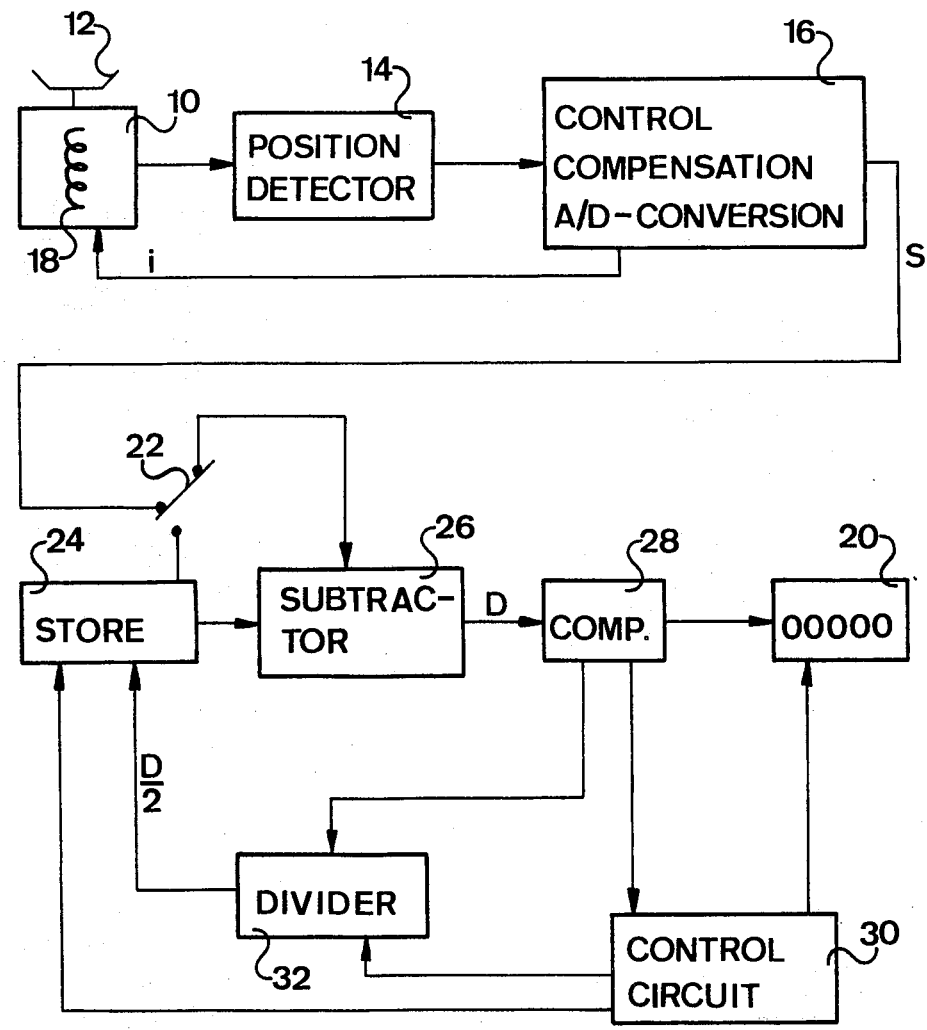

As shown in FIG. 1, a scale 10 has a load receiver, namely a pan 12. Pan 12 moves in accordance with the applied load. The position of the pan is sensed by a sensor 14 which furnishes a voltage corresponding to the so-sensed position. This voltage u is connected to a control and compensation circuit 16 which furnishes a load proportional current i. Current i is applied to a compensation coil 18 which is rigidly connected to pan 12. The compensation coil is arranged in the air gap of a permanent magnet system. The electromagnetic force exerted by coil current i causes the pan to return to an equilibrium position. A digital signal S is also generated in circuit 16. Digital signal S has a value corresponding to load proportional current i and is applied to a digital display 20.

For scales having a relatively high resolution, the signal S includes at least one place more than is visible in digital display 20.

A tare circuit is provided for taking into account the weight of the container holding the substance to be weighed and/or any dead weight the value of which is not to be displayed. The tare circuit includes a tare switch 22. Activation of tare switch 22 causes the digital signal S to be stored in a first storage (store I) having reference numeral 24. In subsequent measuring periods, the so-stored value is subtracted from the newly generated signal S in a subtraction circuit 26. The difference signal generated at the output of subtraction circuit 26 is denoted by D in FIG. 1. Whenever the newly furnished weight signal S is equal to the stored signal, (e.g. if none of the substance to be weighed has as yet been added into the container on pan 12) the signal D becomes zero. This value is then displayed on display 20. When the substance to be weighed is then applied, the difference signal D corresponds to the net weight which is displayed in display 20.

This is the operation of the known scale described in U.S. Pat. No. 3,786,884. No further details of its operation need be given here since it is described herein only to illustrate the incorporation of the present invention into an existing system.

In accordance with the present invention, this known scale is now modified as follows to correct for any possible zero point drift. A comparator 28 is provided for comparing the difference signal (herein referred to as the main difference signal) to a fixed threshold value Sw. This threshold value may, for example, correspond to one unit in the last place displayed on display 20. If the difference D is larger than the threshold value, the assumption exists that a true change in weight is taking place. A control circuit 30, in response to a second difference signal, i.e. a difference signal indicative of a value of D exceeding the threshold value, allows the difference signal D to be displayed on display 20. If the difference D is less than the threshold value, a first difference signal is generated by comparator 28. This first difference signal is not applied to control circuit 30. The display remains unchanged.

According to the invention, the first difference signal is applied to a divider 32 which divides by a factor of two. Hereafter, the contents of storage 24 are algebraically corrected by one half of the first difference.

This process is repeated for each measuring cycle, i.e., every time a new weight proportional signal S is generated. Each time the difference between the newly generated weight proportional signal S and the reference signal is less than the threshold value but consists of at least two units (digits) in the last place the contents of storage 24 are correspondingly corrected.

The above-described procedure and apparatus causes the zero point of the system to be stabilized sufficiently rapidly for practical purposes while preventing over-correction in response to transient oscillations.

Figure 2:
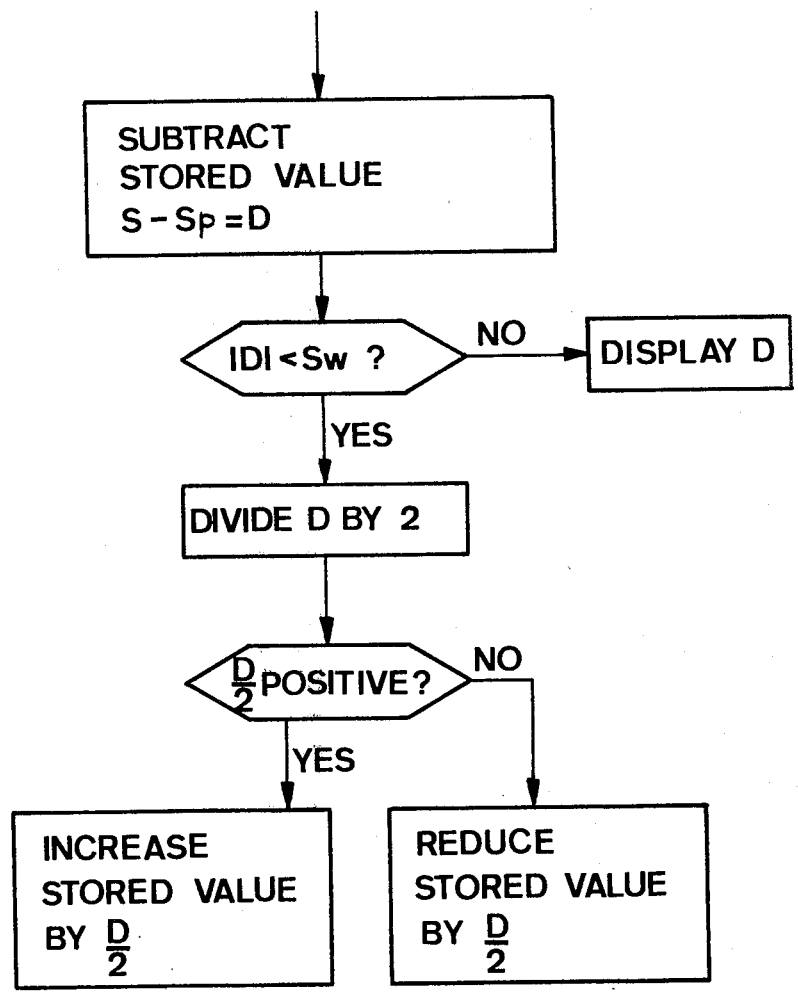

As described, the invention is embodied in circuitry having discrete components of the conventional type. However, a presently preferred embodiment utilizes a microcomputer which is a standard microcomputer utilizing a central processing unit, a read-only memory and a random access memory. A flow chart for such a microcomputer is shown in FIG. 2. Since the steps shown therein directly correspond to the method of operation of the circuit of FIG. 1 as described above, no further discussion seems required.

It should further be noted that the invention is by no means limited to scales having electromagnetic compensation. It is applicable for all scales in which digital weight signals are periodically generated. This, for example, would include scales having strain gauges as sensors, scales with transversely oscillating strings, etc.

While the invention has been illustrated in preferred embodiments, it is not to be limited to the circuits and structures shown, since many variations thereof will be evident to one skilled in the art and are intended to be encompassed in the present invention as set forth in the following claims.

I claim:

1. In a weighing method comprising the steps of periodically generating digital weight proportional signals, comparing said weight proportional signals to a reference signal and generating main difference signals corresponding to the difference therebetween, comparing said main difference signals to a predetermined threshold signal and displaying only main difference signals at least equal to said threshold signal, the improvement comprising the steps of
dividing each of said main difference signals less than said threshold signal by a predetermined factor, thereby creating a fractional difference signal; and
including said fractional difference signal when comparing the next subsequent one of said weight proportional signals to said reference signal, whereby the next furnished one of said main difference signals depends in part upon said fractional difference signal.

2. A method as set forth in claim 1, wherein said predetermined factor is a factor of two, whereby said fractional difference signal is one-half of said main difference signal when said main difference signal is less than said threshold signal.

3. A method as set forth in claim 1, wherein said fractional difference signal is algebraically added to said reference signal prior to said step of comparing the next subsequent one of said weight proportional signals to said reference signal.

4. In a weighing balance having means for periodically generating digital weight proportional signals, first comparing means for comparing said weight proportional signals to a reference signal and generating main difference signals corresponding to the difference therebetween, second comparing means for comparing said main difference signals to a predetermined threshold signal and generating a first or a second difference signal when said main difference signal is, respectively, less than or at least equal to said threshold signal:
automatic zero correction apparatus comprising
means for dividing each of said main difference signals by a predetermined factor, thereby creating a fractional difference signal; and
means for applying said fractional difference signal to a selected one of said reference signal or the next following weight proportional signal, whereby the next furnished one of said main difference signal depends in part upon said fractional difference signal.

5. A weighing balance as set forth in claim 4, wherein said fractional difference signal is algebraically added to said reference signal, thereby creating an adjusted reference signal; and
wherein said first comparing means compares said weight proportional signals to said adjusted reference signal.

* * * * *